United States Patent Office 3,716,095
Patented Feb. 13, 1973

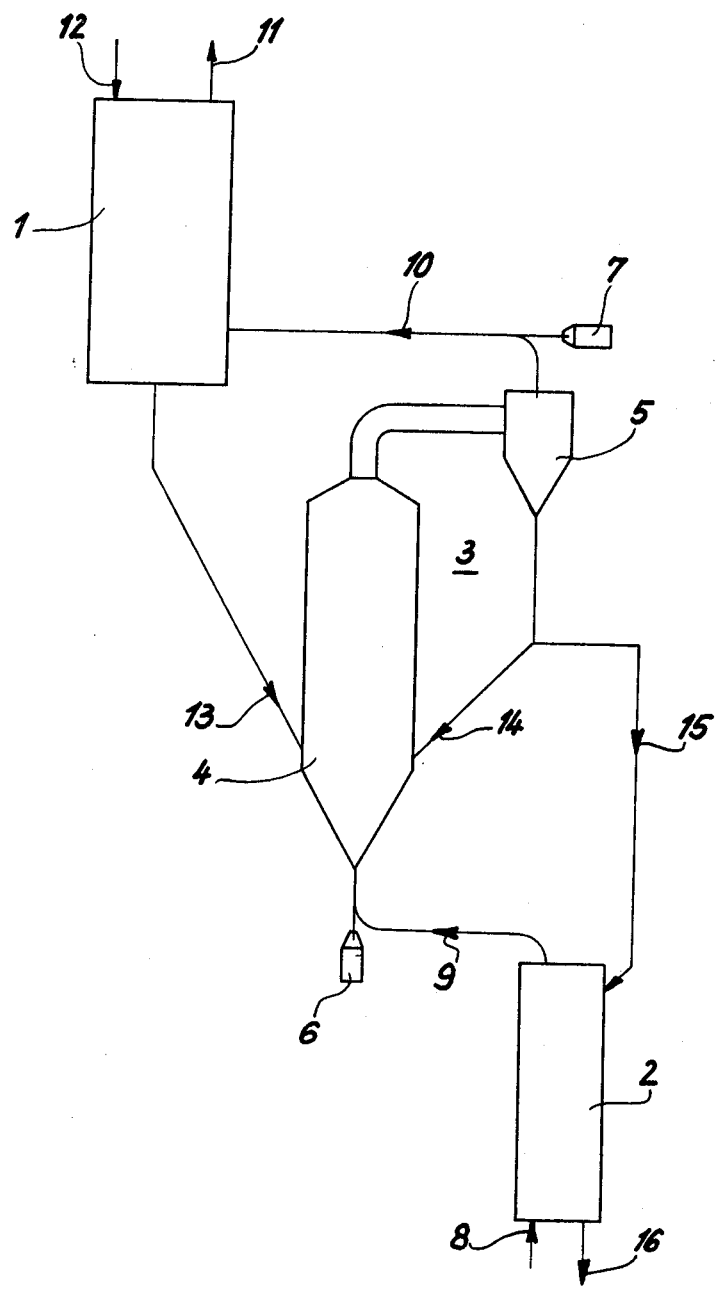

3,716,095
PROCESS FOR HEAT TREATMENT OF FINE GRANULAR MATERIAL
Horst Ritzmann and Wilfried Kruger, Neubeckum, Germany, assignors to Polysius AG, Neubeckum, Germany
Filed Feb. 22, 1971, Ser. No. 117,315
Claims priority, application Germany, Feb. 25, 1970, P 20 08 774.5
Int. Cl. F28
U.S. Cl. 165—1      2 Claims

ABSTRACT OF THE DISCLOSURE

Fine granular material is heated in a countercurrent heat exchanger. The material is maintained in circulation in a stream of hot gas during a predetermined dwell time after the material leaves the heat exchanger, and then is cooled.

BACKGROUND OF THE INVENTION

The invention relates to a process for heat treatment of fine granular material, which is preheated and heated in a countercurrent heat exchange zone and is cooled in a cooling zone.

In the heat treatment of fine granular material, such as limestone, magnesite, dolomite, alumina and the like, it often proves to be difficult to treat simultaneously the various particle sizes of the material. For example, when limestone is fired in a countercurrent heat exchanger, the large particles because of their greater weight fall down through the heat exchanger more rapidly than the fine particles. The coarse particles accordingly are not deacidified as well as the fine particles. On the other hand, if the firing temperature is increased in order to remove the residual carbon dioxide content from the coarse particles, this creates a danger of overheating the fine particles.

Now in the firing of coarse granular material in a vertical shaft it is known to provide, between the firing zone and the underlying cooling zone, a so-called soaking zone in which the material descending from the firing zone will remain for a certain period of time at the attained temperature, so that an exchange of heat may take place between the individual particles of material as well as inside each particle of material.

Accordingly, it might be suggested that in order to eliminate the difficulties hereinbefore described (non-uniform heat treatment of coarse material and fine material in a counter-current heat exchanger), the countercurrent heat exchange zone might be followed by a soaking zone in which the material would remain for a predetermined time before it travels to the cooling zone. However, it has been found that the type of soaking zone which is known for use in a vertical kiln for coarse granular material, in which the material is held in a solid mass, is very poorly suited for fine granular material, which previously has been preheated and heated in a countercurrent heat exchanger and, as a rule likewise in a loosely separated condition, is to be cooled subsequently. The provision of a simple soaking container, in which the fine granular hot material is held in a solid mass, would in fact lead to intolerable caking and agglomeration and thus to serious interference with the process.

SUMMARY OF THE INVENTION

The invention accordingly has for its object to provide a process of the class hereinbefore described which, without the danger of such interference with the operation, assures a very uniform heat treatment of fine granular material, and in particular an adequate heat treatment of the coarse material.

This object is achieved, in accordance with the invention, by maintaining the material leaving the countercurrent heat exchange zone in circulation in a gas stream for a predetermined dwell time before it enters the cooling zone.

In this way, it is not necessary in accordance with the invention that the material leaving the countercurrent heat exchange zone be formed into a mass, with consequent caking and agglomeration, during the period of time which is required in order to equalize the temperature between the coarse and fine material. Moreover, since the material is in motion in a gas stream, it is maintained in a dispersed condition, and thus the above-mentioned interference with the operation is safely prevented. In addition, the movement in the gas stream, with the resulting constant change in position of the individual particles of material, promotes the desired heat exchange between the individual particles.

The circulating movement of the material in the gas stream makes it possible to select an optimum dwell time and thus always to adjust the process exactly to the predetermined conditions.

In processes of the class described, the air discharged from the cooling zone usually after addition of heat forms the heating medium for the countercurrent heat exchange zone. In accordance with a preferred embodiment of the invention, the air discharged from the cooling zone also forms the gas stream in which the material circulates during a predetermined dwell time, while a first heating of the air discharged from the cooling zone takes place ahead of this dwell zone, and the remaining heating of the air takes place after the dwell zone.

Since in this manner the air discharged from the cooling zone is also used as a carrying medium for the material in the dwell zone, the cost of the installation and the energy consumption are reduced. In this way, advantage is taken of the circumstance that the air leaving the cooling zone still possesses a substantial heat content, so that a relatively small addition of heat to the air leaving the cooling zone suffices, to bring it to the temperature which it should have in order to be suitable as a carrying medium in the dwell zone.

In general, it will be advantageous, by means of the first addition of heat to the air leaving the cooling zone, to heat it to about the temperature at which the material leaves the countercurrent heat exchange zone. It is to be understood, according to the nature of the material and the installation, that it is also possible to bring the gaseous carrying medium for the dwell zone to a somewhat higher or a somewhat lower temperature than the material entering the dwell zone.

In order to carry out the process continuously, it is preferable in accordance with the invention to withdraw constantly from the material circulating in the dwell zone a certain adjustable fraction and to supply it to the cooling zone. By choosing the size of this fraction, the average (static) dwell time of the material in the dwell zone can be controlled.

In order to improve the heat exchange between coarse granules and fine granules in the dwell zone, in accordance with the invention, the gas stream which carries the circulating material flows through the dwell zone preferably at least in part along a circular path.

BRIEF DESCRIPTION OF THE DRAWING

The drawing is a schematic illustration of an embodiment of an apparatus for carrying out the process of the present invention.

DESCRIPTION OF THE PREFERRED EMBODIMENT

The apparatus comprises a countercurrent heat exchanger 1, which may be constructed for example as a plurality of cyclone separators, eddy shafts or the like, and in which the fine granular material is preheated and heated. The apparatus further comprises a cooler 2, in which the heat treated material is cooled to the desired final temperature.

Between the heat exchanger 1 which is used for preheating and heating and the cooler 2 is provided a dwell zone 3, which suitably may consist of a shaft-like dwell chamber 4 followed by a separator 5.

The apparatus comprises also two burners 6 and 7.

The cool air supplied to the cooler 2 (arrow 8) flows from the cooler to the dwell chamber 4 (arrow 9) and is then heated by the burner 6. After flowing through the dwell chamber 4 and the separator 5, the air from the cooler is further heated by the burner 7 and enters the heat exchanger 1 which serves for preheating and heating (arrow 10), and then leaves at the upper end (arrow 11).

The material which is supplied to the heat exchanger 1 at the upper end (arrow 12) passes through the heat exchanger in countercurrent to the gas and is thus preheated and heated. The heated material is then (arrow 13) introduced in to the dwell chamber 4, is entrained by the stream of gas flowing upward in the dwell chamber and is separated in the separator 5. A fraction of the material (arrow 14) is led back into the dwell chamber 4, while the remainder of the material (arrow 15) travels to the cooler 2 and leaves it after the cooling (arrow 16). In order to divide into the two fractions (arrows 14, 15) the stream of material which has been separated in the separator 5, there is provided an adjustable diverting device which is not shown in the drawing.

As an example, if it is assumed that the material leaves the heat exchanger 1 which is used for preheating and heating at a temperature of about 1000° C. (arrow 13) the cooling air, leaving the cooler 2 at a temperature of about 700° C. (arrow 9) may be heated by the burner 6 likewise to about a temperature of 1000° C., so that the material may be still maintained for a certain time at the attained temperature in the shaft-like dwell chamber 4 and so that a good heat exchange between the coarse granules and the fine granules may take place. By means of the burner 7, the air leaving the separator 5 is then heated to the temperature which is required in the hottest portion of the heat exchanger 1, for example 1500° C.

It is to be understood that the temperatures hereinbefore mentioned are only examples. The temperatures will be suitably varied in each case by choosing them in accordance with the nature of the material.

We claim:

1. A method of heat treating the fine granular material, comprising the steps of heating a stream of the material in a continuous process by passing it in countercurrent contact with a stream of hot gas in a heating zone, and cooling the streac of material by contacting it with a stream of cooling air in a cooling zone, wherein the improvement comprises the steps of maintaining the material at a substantially constant temperature in a dwell zone, through which the material passes in flowing from the heating zone to the cooling zone, by heating air coming from the cooling zone substantially to the temperature at which the material leaves the heating zone, and recirculating the material in a stream of the air so heated, while continuously withdrawing a fraction of the recirculating material and supplying such fraction to the cooling zone.

2. A method according to claim 1 comprising the step of heating air coming from the dwell zone and supplying the heated air to the heating zone.

References Cited

UNITED STATES PATENTS 2,799,359   7/1957   Johnson ---------- 23—288 G

FOREIGN PATENTS 1,009,449   11/1965   Great Britain ------ 263—21 A

CHARLES J. MYHRE, Primary Examiner

T. W. STREULE, Assistant Examiner

U.S. Cl. X.R.

263—21